March 17, 1942. J. B. PARSONS 2,276,512
REAR QUARTER WINDOW OPERATOR
Filed Feb. 28, 1941 2 Sheets-Sheet 1

Inventor
JOHN B. PARSONS
By Malcolm W. Fraser
Attorney

March 17, 1942.  J. B. PARSONS  2,276,512
REAR QUARTER WINDOW OPERATOR
Filed Feb. 28, 1941  2 Sheets-Sheet 2
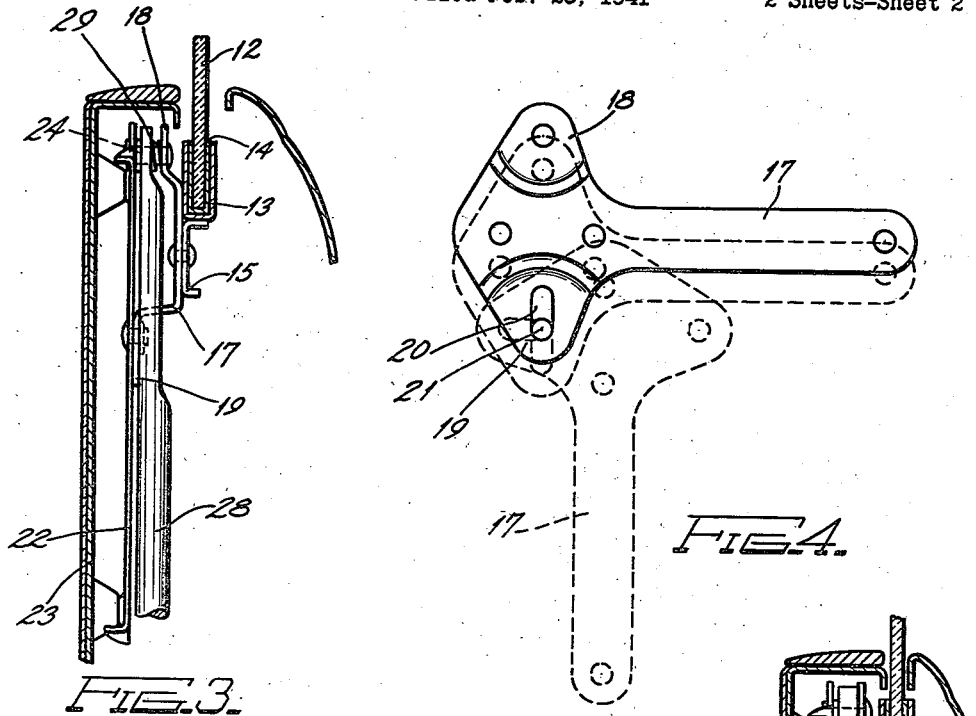
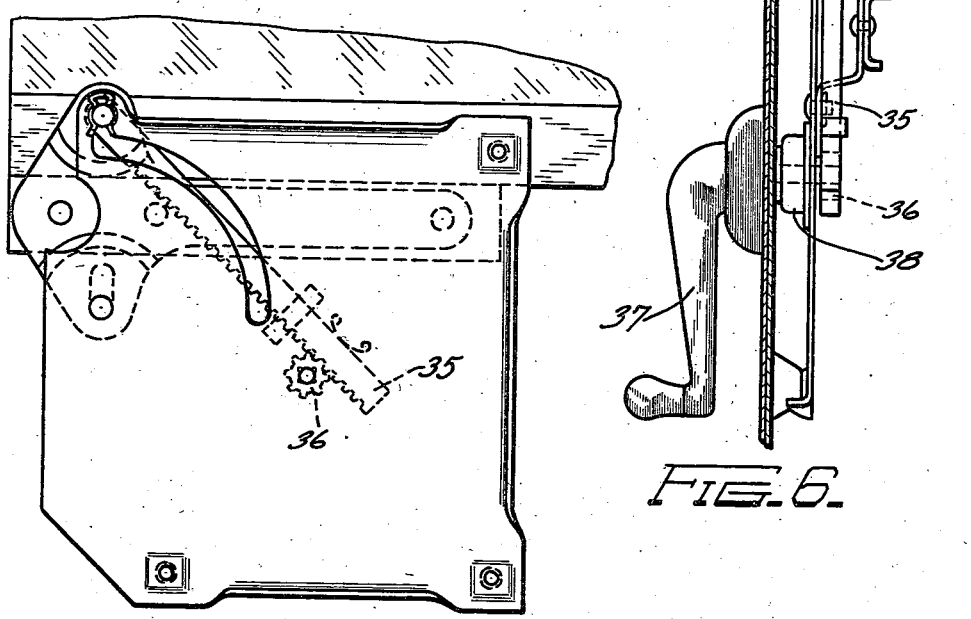
INVENTOR
John B. Parsons
BY Patented Mar. 17, 1942

2,276,512

UNITED STATES PATENT OFFICE 2,276,512

REAR QUARTER WINDOW OPERATOR

John B. Parsons, Toledo, Ohio

Application February 28, 1941, Serial No. 381,109

7 Claims. (Cl. 268—126)

This invention relates to vehicle window regulators but more particularly to regulators adapted for actuating rear quarter windows of vehicles which have a rocking action to and from closed position, and an object is to produce a simple and efficient regulator mechanism of the above character having the new and improved features of construction, arrangement and operation hereinafter described.

For purposes of illustration but not of limitation, embodiments of the invention are shown in the accompanying drawings in which Figure 1 is a fragmentary side elevation of the rear portion of a vehicle body, parts being broken away to show the regulator mechanism for the rear quarter window glass;

Figure 3 is an enlarged vertical sectional elevation substantially on the line 3—3 of Figure 1;

Figure 4 is a diagrammatic view showing the bracket mounting for the window glass and indicating by dotted lines the positions assumed in the operation thereof;

Figure 5 is a fragmentary side elevation similar to Figure 2 but showing the rack and pinion mechanism for manually operating the regulator; and Figure 6 is a vertical sectional view similar to Figure 3 but indicating the manually operating rack and pinion arrangement indicated on Figure 5.

Figure 1:
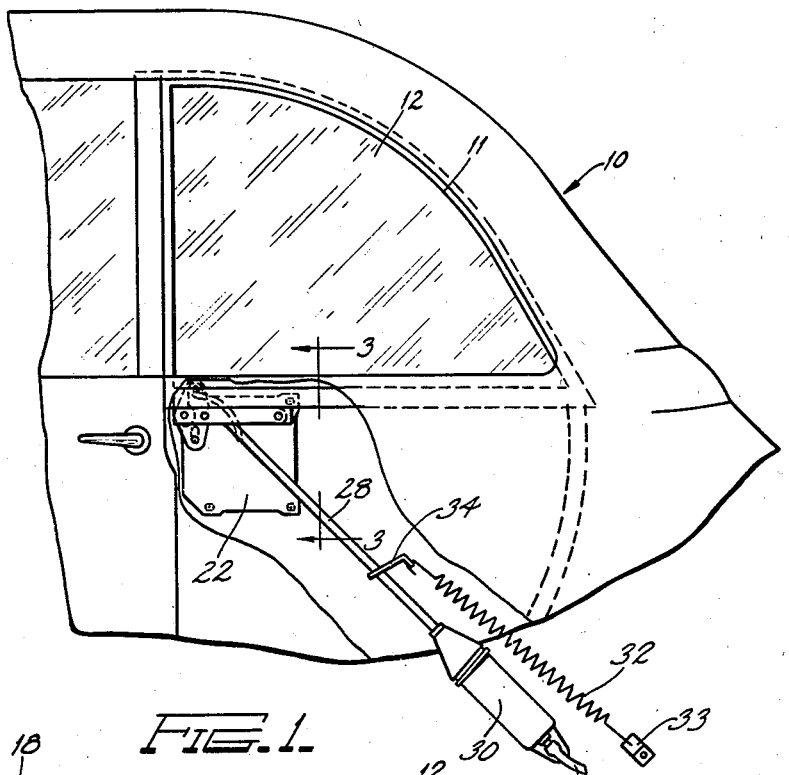
Figure 2:
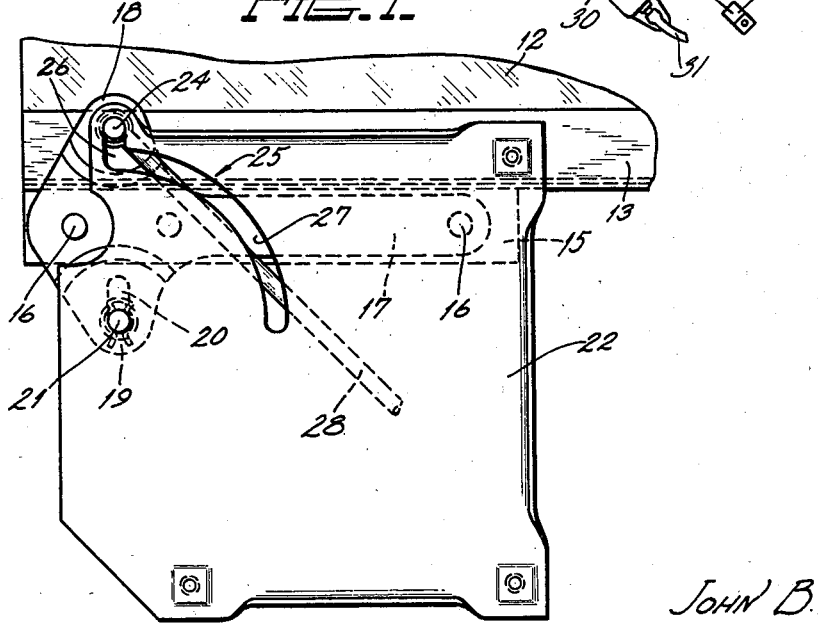
Figure 2 is an enlarged fragmentary side elevation of a portion of the regulator mechanism shown in Figure 1.

The illustrated embodiment of the invention shown on Figures 1 to 4 comprises a vehicle body 10 having a rear quarter substantially triangularly shaped window opening 11 which has a window glass 12 which is shaped to cover the window opening. The up and down and horizontal sides of the window glass together form a substantially right angle and the side forming the hypotenuse of the triangle is curvilinear to correspond to the curvature of the opening 11. When the window glass 12 is in its closed position, the curved side edge portion extends well into the usual channel provided in the vehicle body so that in order to open the window, the latter must first be moved downward rectilinearly a sufficient distance to move the curved side edge portion of the window glass 12 away from its channel to enable the glass thereupon to be rocked downwardly into the well provided in the lower portion of the vehicle body beneath the opening 11. Likewise when the window glass 12 is moved from its open position to its closed position, it is first necessary to rock the window in a counterclockwise direction to the position substantially as indicated in Figure 1 and then impart upward rectilinear movement to it. This movement with respect to rear quarter vehicle windows is well-known to those skilled in the art so that further detail description thereof is not considered necessary.

In this instance, the horizontal edge portion of the window glass 12 is embraced by a channel member 13 which has the usual felt strip 14 interposed between it and the glass 12. Suitably fixed as by welding, to the underside of the channel 13 is a retainer 15 which, in this instance, is disposed only on the left-hand portion of the channel as viewed in Figure 1. Secured by rivets 16 to the inner side of the retainer 15 is a bracket arm 17 which is suitably T-shaped having an upwardly projecting extension 18 and a downwardly projecting extension 19. It will be observed that the bracket is horizontally disposed with the extensions 18 and 19 projecting upwardly and downwardly respectively. As indicated on Figure 3, the downwardly projecting extension 19 extends inwardly away from the retainer 15 and the outer portion thereof extends downwardly at substantially right angles and in parallel relationship to the body of the bracket. The downward extending end portion of the extension 19 is provided with a slot 20 which is disposed at substantially right angles to the body of the bracket 17 and extending through the slot 20 is a stud 21 which is fixed to and projects inwardly from a mounting plate 22 which is suitably secured to the body panel 23. As will hereinafter appear, the stud 21 cooperating with the bracket extension 19 affords a pivotal mounting whereby the window glass 12 is rocked to positions to cover and uncover the window opening 11.

Also as indicated on Figure 3, the upwardly projecting extension 18 has its upper end portion offset inwardly away from the channel 13. Carried by the offset end portion of the extension 18 is a pin 24 which extends through an elongate slot 25 formed in the mounting plate 22. The slot 25 has vertical portion 26 which merges with an arcuate portion 27, the latter having as its axis or center, the stud 21.

A piston rod 28 has its upper end engaging the pin 24 intermediate the bracket extension 18 and the mounting plate 22, a coil spring 29 being carried by the pin 24 to eliminate rattling of the parts. The piston rod 28 has a piston at its lower end which is disposed within a cylinder 30 to which leads a tube 31 for supplying fluid under pressure thereto in any suitable or desired manner for actuating the piston within the cylinder 30 in one direction. A coil spring 32 is anchored at one end to a bracket 33 and at its opposite end to a clamp 34 engaging the piston rod 28.

In operation and assuming that the window glass 12 is in its fully raised or closed position, as indicated in Figure 1, and pressure fluid within the cylinder 30 is released, the tension exerted by the spring 32 against the pin 24 will cause the window 12 to move rectilinearly downward in a path defined by the vertical portion 26 of the slot 25 in the mounting plate 22. When the pin 24 has moved to the lower end of the slot 26, the vertical slot 20 in the bracket extension 19 will have moved along the mounting plate stud 21 so that the latter is in the region of the upper end of the slot 20. The continued pull exerted by the spring 32 will cause the window glass 12 to rock in a clockwise direction (Figures 1 and 2) about the stud 21 as a pivot and in a curvilinear path defined by the curved portion 27 of the slot 25 until the window will have moved to its limited movement or to its fully opened position. It will be manifest that the reverse of the above sequence will take place upon moving the window glass 12 to its closed position, it being understood that fluid under pressure will be introduced to the cylinder 30 through the tube 31 thereby forcing the piston rod 28 outwardly and causing the window glass 12 to be rocked in a counterclockwise direction and thence upward in a vertical direction, the latter movement being guided by the vertical portion 26 of the slot 25 as well as the vertically disposed slot 20.

In the alternate form illustrated on Figures 5 and 6, instead of employing a piston-cylinder-spring mechanism for actuating the window, a rack bar 35 replaces the piston rod 28 being connected at its upper end in a manner similar to the above described mounting of the upper end of the piston rod 28. The rack bar engages a pinion 36 which is adapted to be rotated by a handle 37 disposed on the inside of the vehicle. Associated with the piston 36 is the usual spring clutch 38 of the type ordinarily employed in connection with window regulators. Spring clutches of this type are well-known to those skilled in the art and since the same forms no part of the present invention, detail description is not considered necessary. Suffice it to say that the clutch 38 retains the pinion 36 in the position of adjustment as soon as the crank handle 37 is released. This enables the window glass to be moved to any desired position of adjustment and retained in that position. The remainder of the mechanism is similar to that hereinbefore described so that detail description thereof is not considered necessary.

An important feature of this invention resides in the simple and convenient manner in which the window is moved into and out of engagement with its guide channel and then rocked to open or closed position as the case may be. The parts are largely of metal stampings and therefore lend themselves readily to large scale manufacture on an exceedingly inexpensive basis. Another important characteristic resides in the simplicity in which the parts can be assembled within the vehicle body thereby materially reducing the trouble and expense of installing the regulator mechanism.

It is to be understood that numerous changes in details of construction, arrangement and operation may be effected without departing from the spirit of the invention especially as defined in the appended claims.

What I claim is:

1. Vehicle window regulator mechanism for a window adapted to rock to cover and uncover a window opening, said mechanism comprising a bracket secured to the lower edge portion of the window, an upwardly extending portion on said bracket, a stationary mounting plate provided with an arcuate guide terminating at its upper end in an approximately vertical guide, actuating means including a member carried by said upwardly extending bracket portion and engaging in said guide for movements defined thereby, a downwardly extending portion on said bracket in opposed relation to said upwardly extending portion, a vertically elongate slot in said downwardly extending portion substantially in alignment with said vertical guide, and a stud projecting from said mounting plate into said vertical slot, thereby to enable rocking movements of the window in a path defined by said arcuate guide about said stud as a pivot and to enable vertical movements in a path defined by said vertical guide and slot.

2. Vehicle window regulator mechanism for a window adapted to rock to cover and uncover a window opening, said mechanism comprising a bracket secured to the lower edge portion of the window, an upwardly extending portion on said bracket, a stationary mounting plate provided with an arcuate guide terminating at its upper end in a substantially vertical guide, actuating means including a member carried by said upwardly extending bracket portion and engaging in said guide for movements defined thereby, a rectilinearly movable element engaging said member for imparting movement thereto, a downwardly extending portion on said bracket in opposed relation to said upwardly extending portion, a vertically elongate slot in said downwardly extending portion substantially in alignment with said vertical guide, and a stud projecting from said mounting plate into said vertical slot, thereby to enable rocking movements of the window in a path defined by said arcuate guide about said stud as a pivot and to enable vertical movements in a path defined by said vertical guide and slot.

3. Vehicle window regulator mechanism for a window adapted to rock to cover and uncover a window opening, said mechanism comprising a bracket fixed to the lower edge portion of the window, a stationary mounting plate provided with an arcuate guide terminating at its upper end in a substantially vertical guide, window actuating means including a pin carried by said bracket and engaging in said guide for movements defined thereby, a vertically elongate guide slot in said bracket arranged below and substantially in alignment with said vertical guide, and a stud fixed to said mounting plate and projecting into said vertical slot.

4. Vehicle window regulator mechanism for a window adapted to rock to cover and uncover a window opening, said mechanism comprising a bracket fixed to the lower edge portion of the window, a stationary mounting plate provided with an arcuate guide terminating at its upper end in a substantially vertical guide, window actuating means including a pin carried by said bracket and engaging in said guide for movements defined thereby, a rectilinearly movable member connected at one end to said pin, means for imparting rectilinear movement to said last member, a vertically elongate guide slot in said bracket arranged below and substantially in alignment with said vertical guide, and a stud fixed to said mounting plate and projecting into said vertical slot.

5. Vehicle window regulator mechanism for a window adapted to rock to cover and uncover a window opening, said mechanism comprising a bracket fixed to the lower edge portion of the window, a stationary mounting plate provided with an arcuate guide terminating at its upper end in a substantially vertical guide, window actuating means including a pin carried by said bracket and engaging in said guide for movements defined thereby, pressure fluid means for imparting movement to said pin along said guide, a vertically elongate guide slot in said bracket arranged below and substantially in alignment with said vertical guide, and a stud fixed to said mounting plate and projecting into said vertical slot.

6. Vehicle window regulator mechanism for a window adapted to rock to cover and uncover a window opening, said mechanism comprising a bracket fixed to the lower edge portion of the window, a stationary mounting plate provided with an arcuate guide terminating at its upper end in a substantially vertical guide, window actuating means including a pin carried by said bracket and engaging said guide for movements defined thereby, pressure fluid means for imparting movement in one direction to said pin along said guide, spring means for imparting movement in the opposite direction to said pin, a vertically elongate guide slot in said bracket arranged below and substantially in alignment with said vertical guide, and a stud fixed to said mounting plate and projecting into said vertical slot.

7. Vehicle window regulator mechanism for a window adapted to rock to cover and uncover a window opening, said mechanism comprising a bracket fixed to the lower edge portion of the window, a stationary mounting plate provided with an arcuate guide terminating at its upper end in a substantially vertical guide, window actuating means including a pin carried by said bracket and engaging in said guide for movements defined thereby, a rectilinearly movable rack bar for said pin, a crank operated pinion engaging said rack bar, a vertically elongate guide slot in said bracket arranged below and substantially in alignment with said vertical guide, and a stud fixed to said mounting plate and projecting into said vertical slot.

JOHN B. PARSONS.